April 25, 1939.    H. H. HOOKER    2,156,154
BRAKE SLACK ADJUSTER
Filed Dec. 23, 1937
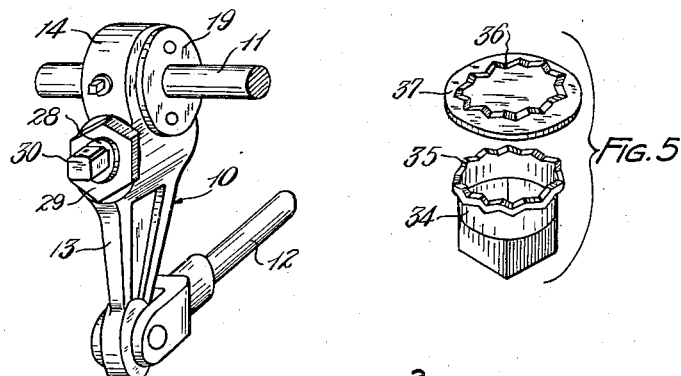
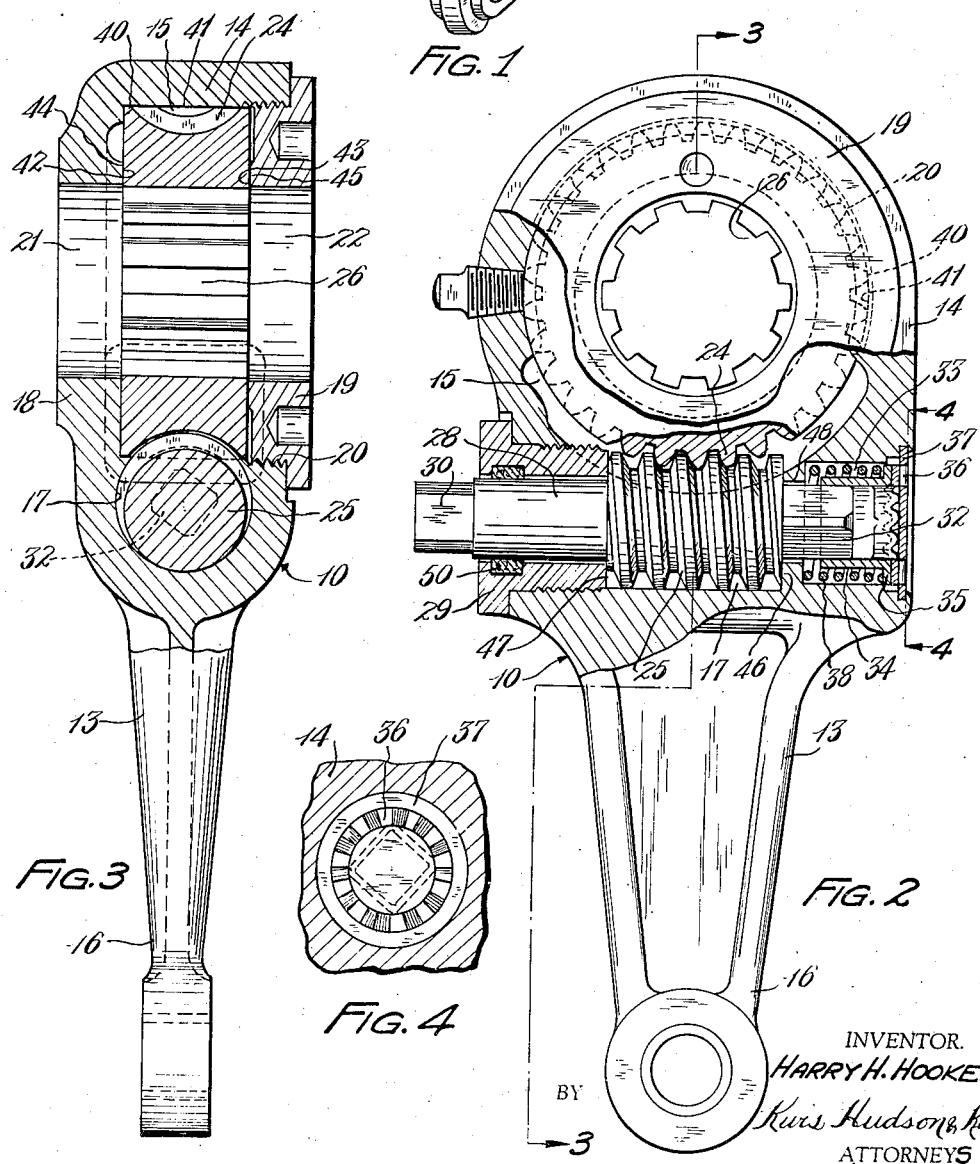
INVENTOR.
HARRY H. HOOKER
ATTORNEYS Patented Apr. 25, 1939

2,156,154

UNITED STATES PATENT OFFICE 2,156,154

BRAKE SLACK ADJUSTER

Harry H. Hooker, Euclid, Ohio, assignor to Eaton Manufacturing Company, Cleveland, Ohio, a corporation of Ohio Application December 23, 1937, Serial No. 181,262

1 Claim. (Cl. 188—196)

This invention relates to operating mechanism for vehicle brakes or various other devices, and more particularly to a slack adjusting device adapted to be embodied in such an operating mechanism.

An object of my invention is to provide a slack adjusting device of simple and inexpensive construction which can be readily embodied in the linkage or mechanism for operating vehicle brakes or other devices, and which will serve efficiently for taking up slack or looseness in such operating linkage or mechanism.

My invention may be further briefly summarized as consisting in certain novel combinations and arrangements of parts hereinafter described and particularly set out in the appended claim.

In the accompanying sheet of drawings,

Fig. 1 is a perspective view showing operating mechanism or linkage embodying a slack adjusting device constructed according to my invention.

Fig. 2 is a side elevation of the device showing the same on a larger scale and with parts thereof broken away.

Fig. 3 is a sectional elevation taken through the device as indicated by line 3—3 of Fig. 2.

Fig. 4 is a partial sectional view taken as indicated by line 4—4 of Fig. 2 for further illustrating the cooperating locking parts, and Fig. 5 is an extended perspective view showing the cooperating locking parts removed from the device.

Further reference will now be made to the accompanying drawing for purposes of a more detailed description of my improved slack adjusting device. Before proceeding with this detailed description, however, I desire it to be understood that the drawing is to be regarded as being mainly illustrative and that the invention may be embodied in various other similar devices.

In Fig. 1 of the drawing I show operating mechanism or linkage which may be used in connection with vehicle brakes or various other devices and which includes my novel slack adjusting device 10. The operating mechanism shown in this instance may also include an oscillatable shaft 11 and a link or connecting rod 12 which is connected with the shaft through my slack adjusting device 10. When this linkage is applied to the operation of a vehicle brake, the shaft 11 may be a rock shaft connected with the usual brake actuating cam and the link 12 may be connected with the usual brake applying pedal.

As illustrated in this instance, my slack adjusting device 10 may be in the form of a lever 13 having a hub portion 14 containing a chamber 15 into which the shaft 11 extends and an arm portion 16 extending from such hub portion and to which the link 12 may be connected. The lever may also be provided with a recess or bore 17 extending substantially normal to the axis of the arm portion 16 and which communicates with the chamber 15 substantially tangentially thereof. The hub portion 14 may be constructed with the side wall 18 of the chamber 15 constituting an integral part of the lever and with its opposite side wall formed as a cover 19 which is adapted to be connected with the lever by a screw connection 20. The wall 18 and the cover 19 may be provided, respectively, with openings 21 and 22 which communicate with the chamber 15 and accommodate the shaft 11.

The slack adjusting means of my improved device may comprise a gear wheel 24 disposed in the chamber 15 and a worm 25 disposed in the recess 17 and meshing with the gear wheel. The gear wheel 24 may have a splined opening 26 which is aligned substantially with the openings 21 and 22 and which receives a splined portion of the shaft 11 for connecting the gear wheel therewith. The slack adjusting means thus provides a connection between the lever 13 and the shaft 11 so that swinging of the lever by the link 12 will cause oscillation of the shaft or vice versa.

The worm 25 may be provided adjacent one end thereof with a stem portion 28 which projects through a bushing 29 mounted in the outer portion of the bore 17 of the lever and which may have a tool engageable part 30 of square or other suitable noncircular cross section at its outer end. This tool engageable part is readily accessible from the exterior of the device so that the worm 25 can be rotated to drive the gear 24 and thereby take up slack or looseness in the operating mechanism or linkage.

At the opposite or inner end of the worm 25 I may provide a projection 32, of square or other suitable non-circular cross section, which extends into an enlargement or counterbore 33 of the worm recess 17. A sleeve 34 of a cross-sectional shape corresponding with that of the projection 32 is axially slidable on the latter and at its outer end carries a serrated or toothed annular flange 35 which is engageable with a corresponding serrated or toothed annular section 36 of a locking part 37. The latter part may be of any suitable form such as a plate which is mounted in the outer end of the counterbore 33 and held by the lever against turning. A helical spring 55

38 disposed around the sleeve 34 causes the serrated flange 35 to engage the serrated section of the part 37 to thereby resist turning of the worm 25. It will be seen that the lock thus formed by the sleeve 34 and the plate member 37 will efficiently hold the worm 25 in any desired position of adjustment, but is readily yieldable by reason of the axial movement permitted the sleeve 34 by the spring 38 so that the worm 25 can be rotated when a wrench or other suitable tool is applied to the portion 30 at the outer end of the worm shaft.

In mounting the gear wheel 24 in the chamber 15 and the worm 25 in the recess 17 it will be noted that I provide for rotation of these members directly in the chamber and recess and do not provide any other bearing or journal for these members than is provided by the inner wall surfaces of such chamber and recess. In other words, I construct the gear wheel 24 so that its peripheral outer face 40 formed by the tops of its teeth will have direct sliding engagement with the inner face 41 of the chamber 15. Likewise the thickness of the gear wheel 24 is such that its side faces 42 and 43 will have direct sliding engagement respectively with the adjacent inner side faces 44 and 45 of the chamber. It will thus be seen that the gear 24 is definitely held in position in the chamber 15 with the axis of its opening 26 substantially aligned with the axis of the openings 21 and 22 and that, at assembly of the device, the mere placing of the gear in the chamber properly locates the same therein.

Similarly with respect to the worm 25, I mount the latter member in the recess 17 so that the peripheral surface provided by the top of the worm thread has direct bearing engagement with the arcuate inner face of this recess and since this face is somewhat greater in extent than a half of a cylinder the worm will be definitely held in place in mesh with the gear and with its axis substantially coincident with the axis of the recess. The inner and outer end faces of the worm have direct bearing or thrust engagement, respectively, with the shoulder 46 of the lever and the shoulder 47 provided by the inner end of the bushing 29. It should be noted at this time that although the stem projection 28 extends through the opening of the bushing 29 and the projection 32 extends into the opening 48 of the lever, these portions of the worm are not journaled in such openings but have substantial clearance therein. If desired an annular packing ring 50 may be mounted in the bushing 29 to sealingly engage the stem portion 28 so as to exclude water and dust from the interior of the device.

From the foregoing description and the accompanying drawing it will now be seen that I have provided a slack adjusting device of simple and economical construction which can be readily embodied in mechanism or linkage for operating vehicle brakes or other devices. It will be seen furthermore that the simplicity of this slack adjusting device and its efficiency and reliability of operation are due largely to the fact that the gear wheel and worm are mounted in the chamber and recess of the lever so that their peripheral portions have direct bearing engagement with the inner faces of such chamber and recess. With this form of construction it will also be seen that the gear and worm members can be quickly and easily inserted and located during the assembling of the device and, since the bearing surfaces for these members are located inside the device, dust and other foreign matter will be effectively excluded therefrom during normal operation. The efficient locking means associated with the worm permits the same to be readily adjusted for the purpose of taking up slack or looseness, but holds the worm after the desired adjustment has been made. This locking means is housed in a portion of the worm recess of the lever and is thereby protected from water and dust which would otherwise cause corrosion and interference.

While I have illustrated and described my slack adjusting device in a somewhat detailed manner, it will be understood, of course, that I do not wish to be limited to the precise details and arrangements of parts herein disclosed but regard my invention as including such changes and modifications as do not involve a departure from the spirit of the invention and the scope of the appended claim.

Having thus described my invention, I claim:

A slack adjuster for a brake operating mechanism or the like having an oscillatable shaft, comprising a lever having a hub portion provided with a chamber into which said shaft extends, a gear wheel in said chamber and connected with said shaft, said lever having a recess therein adjacent said chamber, a worm in said recess meshing with said gear wheel, said worm having at one end thereof a tool-engageable portion accessible from the exterior of the device, and a locking device comprising a non-circular portion at the other end of the worm, a toothed locking part on the lever, a sleeve slidable on said non-circular portion and having a toothed portion engageable with said toothed locking part, and a helical spring acting on the sleeve to cause releasable engagement of the same with said locking part, said locking device being housed in a portion of said recess.

HARRY H. HOOKER.